Patented Oct. 10, 1939

2,175,279

UNITED STATES PATENT OFFICE 2,175,279

LEAD-BISMUTH-LITHIUM CABLE SHEATH

Hans Osborg, New York, N. Y., assignor to Maywood Chemical Works, Maywood, N. J., a corporation of New Jersey No Drawing. Original application November 9, 1935, Serial No. 48,987. Divided and this application August 21, 1936, Serial No. 97,109

6 Claims. (Cl. 207—10)

The present invention relates to a process for manufacturing lead-bismuth-lithium cable sheath and to a process for manufacturing an extrudable and workable lead-bismuth-lithium alloy therefor.

Heretofore, a number of lead alloys have been used commercially and others have been proposed for the manufacture of leaden cable sheaths, but none of these alloys has been found to possess the necessary combination of the essential and salient features which a lead alloy should have if it is to meet the requirements for high strength cable sheathing. The history of and the requirements for cable sheathing, especially high strength cable sheathing have been described in an authentic manner by R. S. Dean and J. E. Ryjord in their article in Metals and Alloys (vol. 1, No. 9, March 1930). In essence, Dean and Ryjord have concluded that: "In selecting mechanical properties it is necessary to compromise between pliability and high strength. A study for installation and service conditions leads to a tensile value of around 4000 lbs. per sq. in. as the most desirable value. This strength should, of course, be accompanied by the maximum possible fatigue limit." In other words, it has been recognized by the experts and outstanding authorities in the art that the desired combination of essential properties was only attained in industrial practice by sacrificing pliability or strength or both. The various attempts to improve lead cable sheathing by the addition of alloying metals have been described fully and authoritatively by Schumacher and Boulton in their article in Metals and Alloys (volume 1, No. 9, March 1930). Among the attempts may be mentioned the addition of calcium, lithium, antimony, tin and/or cadmium to lead as disclosed in U. S. Patents Nos. 1,880,746, 1,890,013, 1,890,014 and 1,926,545. For some years, 1 to 3% tin was added to lead, but after 1907 a 1% antimony-lead alloy was adopted as the standard sheathing for cables. Due to failures in service of antimony-lead cable sheathing, endeavors were made to replace the antimony-lead with calcium-lead, lithium-lead, cadmium-lead, cadmium-antimony-lead or cadmium-tin-lead, but, as far as I am aware, none of these lead alloys has been adopted and antimony-lead is still used despite its shortcomings and disadvantages.

I have made the surprising discovery that a superior cable sheathing can be produced from lead containing not only bismuth but also lithium within critical and special ranges.

It is an object of the present invention to provide a process for the manufacture of a special lead-bismuth-lithium alloy.

It is a further object of the invention to provide a process of producing and manufacturing the special lead-bismuth-lithium alloy which permits the production under industrial condition of superior, more uniform and more economical results than standard or customary industrial procedure.

It is also within the contemplation of the present invention to provide a cable sheath constituted of a lead alloy containing about 0.03 to about 0.09% of bismuth, about 0.005 to about 0.025% of lithium, and the balance commercially pure lead.

The invention likewise contemplates the provision of a novel leaden cable sheath or leaden pipe containing bismuth and lithium.

It is also an object of the invention to provide a new process of manufacturing leaden cable sheaths and leaden pipes containing bismuth and lithium.

Other objects and advantages of the invention will become apparent from the following description.

The industrial process of making the lead-bismuth-lithium alloys and manufacturing cable sheaths from these alloys can be carried out in many ways, but I have found that the following method produces better results than standard practice.

Lead, containing bismuth in amounts of about 0.03 to 0.09%, is heated to at least about 800° F. and then the desired amount of lithium is added. The lithium can be added in any convenient form, such as metallic lithium, as a master alloy containing a few percent of lithium, in lumps, as rod or wire, or the like. The amount of lithium added to the molten lead, or lead alloy, should be approximately 0.005% higher than the lithium percentage which is actually desired as lithium content in the finished alloy. I have discovered that an amount of approximately 0.005% of lithium is always required for the scavenging of lead, even if the lead is of the high purity available in commercial brands, as for example in electrolytic lead. These 0.005% of lithium perform a scavenging action producing a boiling effect in the molten lead. The casting properties of the molten lead alloy and the quality of the finished product are considerably improved by this scavenging action. In order to obtain a uniform distribution of the alloying constituents, the temperature of the bath should be kept at approximately 800° F. for some time, while the bath is thoroughly stirred. If these simple but important rules are followed, the undesirable wet drossing which occurs in the beginning of the alloying procedure will be reabsorbed by the lead alloy and will disappear leaving only a slight amount of a practically dry dross on the surface of the thus treated alloy.

In the industrial production of leaden pipes, leaden cable sheaths, or the like, a holding furnace, containing a large amount of molten lead or lead alloy, is employed. The production of the desired lead alloy takes place in this furnace from which the extrusion press is charged in certain intervals of time. I have discovered that better and superior results and greater economy are obtainable by not following the standard practice. Instead, only the lead containing the desired amount of bismuth is kept molten in the holding furnace. Just before charging time, slightly more lead than is necessary to fill up the extrusion press, for example some 800 lbs. of the molten metal, are transferred from the furnace into a heated pot, or kettle, or container in which the addition of and the alloying with lithium is carried out in accordance with the above given instructions, and without difficulty. After the alloying procedure is finished, the extrusion press is charged by pouring the molten lead alloy into the press, in any convenient manner. Another suitable alloying method consists in adding the lithium, e. g., in the form of a ¼ in. wire, to the sufficiently hot metal while it is flowing from the holding furnace into the press. Of course, the temperature of the press has to be kept high enough to prevent the lead alloy from freezing before the scavenging action is over. If this method is applied, the necessary stirring action is performed by the whirling of the flowing metal itself.

The industrial production of the present lead-bismuth-lithium alloy cable sheathing was also carried out in the manufacture of oil filled high tension cables. It is known that the cable sheathing for this type of cables has to meet higher requirements than for other types of cables. Tests conducted on lead-bismuth-lithium cable sheathing proved that the cable can be easily reeled and unreeled, i. e., that it is pliable. Electric tests as well as long time pressure tests were also satisfactory. The outcome of these tests is of special importance because usually a tensile strength as high as 4000 pounds per sq. in., if combined with a pronounced stiffness, should be expected to cause failure in the aforesaid tests. The satisfactory behavior of the lead-bismuth-lithium alloy cable sheaths under these severe practical plant and service tests confirms the results of the physical tests which showed that the lead-bismuth-lithium alloy possesses, at the same time, great strength and good ductility as well as stiffness and toughness. In other words, contrary to practical experience the tensile strength is not increased at the expense of pliability or ductility.

Under industrial conditions, best results and properties are obtained with an actual lithium content of about .02% in the finished alloy or product. It is noteworthy, that the very nature of the lead-bismuth-lithium alloy permits flexibility in physical properties. By keeping the bismuth content within a range of about 0.03% to about 0.09% and varying the lithium content, the physical properties, especially the strength, can be increased or decreased as desired.

In the present lead-bismuth-lithium alloy, the hardness is a comparatively unimportant sub-feature, while its outstanding characteristics are to be found in its great strength and good ductility, stiffness and toughness, in its remarkably high fatigue limit, and in its good corrosion resistance. None of these properties, nor the unusual combination of, e. g., high strength and good ductility nor the high modulus of elasticity, nor the application of the essential element bismuth are mentioned in or can be anticipated or predicted from the prior art.

The present application is a division of my application, Serial No. 48,987, filed on November 9, 1935, now Patent No. 2,140,544, dated December 20, 1938.

I claim:

1. The process of manufacturing an extrudable and workable lead alloy containing bismuth and lithium which comprises establishing a melt of lead containing about 0.03% to about 0.09% of bismuth, maintaining said melt at a temperature of at least about 800° F., adding about 0.005% to about 0.025% of lithium to said lead melt, stirring the melt until any wet dross is practically completely incorporated in said melt, and casting lead containing bismuth and lithium from said melt.

2. The process of manufacturing an extrudable and workable lead alloy containing bismuth and lithium which comprises establishing a melt of lead containing about 0.03% to about 0.09% of bismuth, maintaining said melt at a temperature of at least about 800° F., adding about 0.005% to about 0.025% of lithium to said lead melt, and in addition, about 0.005% lithium more than desired in the final lead alloy, stirring the melt until any wet dross is practically completely incorporated in said melt, removing remaining dry dross, and casting lead containing bismuth and lithium from said melt.

3. The process of manufacturing a lead cable sheath containing bismuth and lithium which comprises establishing a melt of lead containing about 0.03% to about 0.09% of bismuth, maintaining said melt at a temperature of at least about 800° F., adding about 0.005% to about 0.025% of lithium to said lead melt, stirring the melt until any wet dross is practically completely incorporated in said melt, transferring said melt into an extrusion press, and extruding lead-bismuth-lithium cable sheath from said press.

4. The process of manufacturing a lead cable sheath containing bismuth and lithium which comprises establishing a melt of lead containing about 0.03% to about 0.09% of bismuth, maintaining said melt at a temperature of at least about 800° F., adding about 0.005% to about 0.025% of lithium to said lead melt, and in addition, about 0.005% lithium more than desired in the final lead cable sheath, stirring the melt until any wet dross is practically completely incorporated in said melt, removing dry dross from the surface of the melt, transferring said melt into an extrusion press, and extruding lead-bismuth-lithium cable sheath from said press.

5. The process of manufacturing lead cable sheath containing bismuth and lithium which comprises melting lead containing about 0.03% to about 0.09% of bismuth, maintaining a temperature of at least about 800° F., transferring a portion of said melt into an extrusion press, adding about 0.005% to about 0.025% of lithium to said melt while it flows from the furnace into the press, and extruding a lead cable sheath containing bismuth and lithium from said press.

6. The process of manufacturing lead cable sheath containing bismuth and lithium which comprises melting lead containing about 0.03% to about 0.09% of bismuth, maintaining a temperature of at least about 800° F., transferring a portion of said melt into an extrusion press, adding about 0.005% to about 0.025% of lithium and about 0.005% of lithium in excess to said melt while it flows from the furnace into the press, said amount of lithium being about 0.005% higher than is desired in the lead cable sheath, and extruding a lead cable sheath containing bismuth and lithium from said press.

HANS OSBORG.